US012597702B2

(12) United States Patent
Chakam et al.

(10) Patent No.: US 12,597,702 B2
(45) Date of Patent: Apr. 7, 2026

(54) ANTENNA MODULE FOR A MOTOR VEHICLE

(71) Applicant: Continental Automotive Technologies GmbH, Hannover (DE)

(72) Inventors: Guy-Aymar Chakam, Saal an der Donau (DE); Benjamin Becker, Sinzing (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 41 days.

(21) Appl. No.: 18/287,422

(22) PCT Filed: Feb. 16, 2022

(86) PCT No.: PCT/DE2022/200021
§ 371 (c)(1),
(2) Date: Oct. 18, 2023

(87) PCT Pub. No.: WO2022/223078
PCT Pub. Date: Oct. 27, 2022

(65) Prior Publication Data

US 2024/0213661 A1 Jun. 27, 2024

(30) Foreign Application Priority Data

Apr. 19, 2021 (DE) ..................... 10 2021 203 836.0

(51) Int. Cl.

| | |
|---|---|
| ***H01Q 1/32*** | (2006.01) |
| ***H01Q 1/36*** | (2006.01) |
| ***H01Q 21/28*** | (2006.01) |

(52) U.S. Cl.
CPC ............. *H01Q 1/3275* (2013.01); *H01Q 1/36* (2013.01); *H01Q 21/28* (2013.01)

(58) Field of Classification Search
CPC ........ H01Q 1/3275; H01Q 1/36; H01Q 21/28; H01Q 5/378
See application file for complete search history.

(56) References Cited

U.S. PATENT DOCUMENTS 11,804,653 B2 * 10/2023 Terashita ................. H01Q 9/36
12,009,583 B2 * 6/2024 Terashita ............... H01Q 21/28
(Continued)

FOREIGN PATENT DOCUMENTS

CN 209948036 U 1/2020
EP 3913742 A1 11/2021
(Continued)

OTHER PUBLICATIONS

Extended EP Search Report dated Oct. 31, 2024 from corresponding European patent application No. 24189492.2.
(Continued)

*Primary Examiner* — Hai V Tran

(57) ABSTRACT

An antenna module for a motor vehicle, comprises at least one electrically small AM-FM antenna and a DAB antenna. The antenna module comprises an antenna unit comprising the combined AM-FM antenna and the DAB antenna, wherein the antenna unit comprises at least one first circuit board having a first height in a first direction and a first width in a second direction that is perpendicular to the first direction, wherein helical antenna turns of the AM-FM antenna and/or DAB antenna, at least part of which is a planar helical antenna, are arranged on the at least one first circuit board, wherein the helical antenna turns run in the second direction, wherein at least one LTE 5G telephone antenna is arranged on a second circuit board having a second height in the first direction and a second width in a third direction different from the first and second directions.

16 Claims, 6 Drawing Sheets

(56) References Cited

U.S. PATENT DOCUMENTS

| | | | | |
|---|---|---|---|---|
| 2016/0064807 | A1* | 3/2016 | Reed | H01Q 21/28<br>343/749 |
| 2018/0269567 | A1 | 9/2018 | Kim | |
| 2020/0028249 | A1 | 1/2020 | Terashita et al. | |
| 2021/0057805 | A1 | 2/2021 | Yang et al. | |
| 2024/0178554 | A1* | 5/2024 | Hara | H01Q 1/42 |

FOREIGN PATENT DOCUMENTS

| | | | |
|---|---|---|---|
| KR | 20160044114 | A | 4/2016 |
| KR | 20170003986 | U | 11/2017 |
| KR | 20190091688 | A | 8/2019 |

OTHER PUBLICATIONS

Notice under Rule 71(3) Communication dated Nov. 15, 2024 from corresponding European patent application No. 22709174.1.
Office Action dated Jan. 21, 2022 from corresponding German patent application No. 10 2021 203 836.0.
International Search Report and Written Opinion dated Jun. 15, 2022 from corresponding International patent application No. PCT/DE2022/200021.

* cited by examiner

ANTENNA MODULE FOR A MOTOR VEHICLE

The invention relates to an antenna module for a motor vehicle, wherein the antenna module has at least one AM antenna, FM antenna and DAB antenna.

The networking of motor vehicles continues to increase. Whereas in the past antennas of motor vehicles were intended mainly for radio reception, today antennas have to be integrated in addition. Such additional antennas are, for example, WLAN antennas, V-to-X antennas, antennas for providing a mobile radio or Internet connection, which can simultaneously also be used as e-call antennas, or antennas for providing location services, such as a GNSS antenna. In particular, multiple antennas, for example an AM antenna, an FM antenna, and a DAB antenna, are in turn advantageous for radio reception. It would be desirable to be able to accommodate as many antennas as possible firstly in the most compact way and also together in the smallest possible installation space as a module. However, there is the problem that antennas themselves have to be designed to be sufficiently large to allow sufficiently good reception in their associated frequency range, and secondly there is the problem that, depending on the transmission or reception frequency range, antennas can also interfere with one another if they are arranged too close together. Furthermore, especially in the case of antenna modules for motor vehicles, there is the further problem that these should be arranged in an area of the motor vehicle in which the antenna reception is not too strongly shielded by the motor vehicle casing. It would therefore be advantageous to position the antennas outside the motor vehicle. Here, however, the installation space situation is tighter still due to regulations or for design reasons. LTE 5G telephone antennas designed as roof antennas are already known. The other antennas mentioned above are usually positioned elsewhere, however. For example, because of their length, antennas for radio reception are often integrated in windows, such as the rear window of the vehicle.

The object of the present invention is therefore to provide an antenna module for a motor vehicle that makes it possible to provide as many different functions as possible in the smallest possible installation space.

This object is achieved by an antenna module having the features of claim 1. The dependent claims, the description and the figures relate to advantageous embodiments of the invention.

An antenna module according to the invention for a motor vehicle has an antenna unit having at least one AM antenna, FM antenna and DAB antenna, wherein the AM antenna and the FM antenna are in the form of a combined AM-FM antenna, wherein the antenna unit has at least one first circuit board having a first height in a first direction and a first width in a second direction that is perpendicular to the first direction, wherein helical antenna turns of the AM-FM antenna and/or DAB antenna, at least part of which is in the form of a planar helical antenna, are arranged on the at least one first circuit board, and wherein the helical turns, for the most part, run in the second direction, and wherein the LTE 5G telephone antenna is arranged on a second circuit board having a second height in the first direction and in a second width in a third direction that is different from the first and second directions.

The invention is based on the insight that this design of the AM-FM antenna and the DAB antenna firstly permits an electrically very small AM-FM antenna and DAB antenna to be provided, and this described design also permits further antennas, for example an LTE 5G telephone antenna, to be arranged substantially perpendicularly to the helical turns of the AM-FM antenna or the DAB antenna, as a result of which it is possible to provide maximum decoupling between such an LTE 5G telephone antenna and the antenna unit. This, in turn, permits another antenna, such as preferably an LTE 5G telephone antenna of this kind, to be arranged extremely close to the antenna unit, for example in the range of a few centimeters, or even a few millimeters. In addition, both the AM-FM antenna and the DAB antenna can be provided extremely compactly as a result of their being in the form of at least part of a planar helical antenna, which in turn facilitates extremely compact provision of the antenna unit. For the first time, it is thus possible to provide an antenna module in which at least one first LTE 5G telephone antenna and a radio antenna unit having an AM antenna, FM antenna and a DAB antenna can be integrated, specifically in an extremely small installation space.

Accordingly, a further advantageous embodiment of the invention is when the antenna module also has at least one LTE 5G telephone antenna arranged on a second circuit board having a second height in the first direction and in a second width in a third direction that is different from the first and second directions.

An LTE 5G telephone antenna is intended to be understood to mean an antenna designed to send and receive signals according to a mobile radio standard, in particular according to the LTE (Long Term Evolution) standard and 5G standard and optionally also the 4G standard and/or GSM standard. The more such LTE 5G telephone antennas are provided, the higher the data transmission rates that can be achieved. This is also referred to as MIMO (Multiple In Multiple Out), because information to be transmitted can be transmitted and received proportionately in parallel by multiple antennas. This means that more antennas can also provide communication according to a radio standard having higher transmission rates, e.g. 5G. For example, two such antennas can provide communication according to the 4G standard, and four such antennas can provide communication according to the 5G standard. The term LTE 5G telephone antenna is thus intended to be understood in the present case to mean that these LTE 5G telephone antennas can be used for communication according to the 5G standard, but not that a single such antenna would already be sufficient for this purpose. However, mobile radio communication at lower data transmission rates than according to the 5G standard can already be provided using a single such LTE 5G telephone antenna.

An AM (amplitude modulation) antenna is understood to mean in particular an antenna that is designed to send and receive signals in the medium-wave range, in particular at around 0.5 MHz to around 2 MHz. Accordingly, an FM (Frequency Modulation) antenna is designed to receive and/or to send signals in the range between 87.5 megahertz and 108 megahertz, and a DAB (Digital Audio Broadcasting) antenna is designed to receive and/or to send signals in the range between 174 megahertz and around 240 megahertz. Furthermore, a combined AM-FM antenna is intended to be understood to mean an antenna in which the AM antenna and the FM antenna have a common base. In addition, the AM antenna and the FM antenna can also share the applicable helical antenna turns arranged on the at least one first circuit board. Due to the different frequency ranges of AM and FM, there is no risk here of a negative effect on the reception quality. This can advantageously be used to design an extremely compact and at the same time efficient antenna. Another way to increase or secure the good reception quality of AM and FM from a common base is to appropriately design the crossover or filters with SMD (Surface Mounted Device) components on the motherboard in the respective amplifiers.

An additional roof capacitance as part of the AM-FM antenna or the DAB antenna can additionally reduce the size of the design of the antenna unit, as will be described in more detail later. In other words, the AM-FM antenna or the DAB antenna can also be of two-part design, one part being provided by the roof capacitance and the other part by the applicable helical antenna turns.

Both the combined AM-FM antenna and the DAB antenna can be provided as respective planar helical antennas, that is to say apart from the respective roof capacitances. The AM-FM antenna can be realized on a different circuit board from the DAB antenna, or on the same circuit board. The second case is particularly preferred, as it allows a much more compact design of the antenna unit. Accordingly, a further advantageous embodiment of the invention is when the helical antenna turns of the DAB antenna and of the AM-FM antenna are arranged on the common first circuit board. It is also advantageous when the helical antenna turns of the DAB antenna and of the AM-FM antenna are arranged beside one another in the second direction. In principle, however, it is also conceivable for them to be arranged one above the other in the first direction. In this case, it would be necessary to provide an electrically conductive connection from the higher antenna to its associated base on the underside of the circuit board in the opposite direction to the first direction. This provides an electrically conductive surface that extends substantially in the opposite direction to the first direction, which has disadvantages in terms of the decoupling from the LTE 5G telephone antenna, most of which is oriented in the first direction. Accordingly, it is very advantageous when the DAB antenna and the AM-FM antenna, at least the helical antenna turns thereof, are arranged beside one another in the second direction. This additionally improves the decoupling from the LTE 5G telephone antenna, since the antenna components of the DAB and AM-FM antennas that run parallel to the first direction can be reduced to a minimum.

Furthermore, the consideration of the direction of rotation of the helical antenna turns is very advantageous for the embodiment of the helical antenna turns, since this direction of rotation influences the coupling between the individual antennas and thus the efficiency curve of the antennas. The same direction of rotation of the helical antenna turns is preferred for the AM-FM antenna and the DAB antenna. However, a direction of rotation that is the opposite of each other is also conceivable.

As already mentioned, a further very advantageous embodiment of the invention is when the AM-FM antenna has a first roof capacitance that is arranged above the first circuit board in the first direction and that is galvanically coupled to the helical antenna turns of the AM-FM antenna, in particular wherein the DAB antenna has a second roof capacitance that is arranged on a circuit board edge of the first circuit board above the helical antenna turns of the DAB antenna in the first direction and is galvanically connected to the helical antenna turns of the DAB antenna. In principle, the DAB antenna and the AM-FM antenna could also use a common roof capacitance, that is to say they could be galvanically connected to a common roof capacitance. However, the fact that the DAB antenna has an associated separate second roof capacitance can in turn provide improved decoupling. It is additionally possible to provide a capacitive coupling between this second roof capacitance and the first roof capacitance as a result of the second roof capacitance being implemented on the circuit board edge. The second roof capacitance can therefore itself be designed to be very small and, for example, can be limited to said circuit board edge, which is at least a part of a lateral edge of the first circuit board. The first roof capacitance is preferably not located on the first circuit board itself, but rather is provided for example by a separate surface above this first circuit board. There are several ways to couple the first roof capacitance to the first circuit board. Preferably, the coupling is made using an electrically conductive element that preferably allows compensation for tolerances in the first direction. This allows the first roof capacitance to be arranged more easily on a different component from the first circuit board. For example, the coupling can be made using a spring or a contact foam. Such a contact foam then comprises metallic particles, for example, in order to be electrically conductive. The contact with the first roof capacitance of the AM-FM-DAB antenna can also be made differently, however, for example by clamping. In addition, there are in turn many possibilities for the design of the first roof capacitance. For example, this roof capacitance can be implemented as an assembled, for example punched or deep-drawn, metal sheet or as a glued film on a support. It can also be printed on a support. This support may be a protective cap, for example, in which the module components of the antenna module are arranged.

Since the invention and its embodiments advantageously allow an antenna module to be provided in an extremely small installation space with many antennas, it is preferred for this antenna module to be accommodated in a roof area of a motor vehicle under an outer cover of the motor vehicle, which is also referred to as a shark fin. Said protective cap is then accordingly located beneath this outer cover. The roof capacitance, in particular the first roof capacitance, can then be arranged on the protective cap, for example, or also integrated in the outer cover, that is to say the shark fin itself. The roof capacitance can also be provided just as a film arranged on an appropriate support. In this case, the film can also be provided with a conductor track structure. Such a conductor track structure can be designed as a resonant conductor track structure and improve the decoupling.

In a further very advantageous embodiment of the invention, the AM-FM antenna has a higher efficiency in a first specific frequency range than in a specific second frequency range, in particular wherein the first specific frequency range corresponds to the FM frequency range and the second frequency range to the DAB frequency range. Furthermore, it is preferred when the DAB antenna has a lower efficiency than the AM-FM antenna in the first frequency range and a lower efficiency than in the second frequency range, in which the DAB antenna also has a higher efficiency than the AM-FM antenna. This can be provided by a geometric design of the AM-FM antenna and the DAB antennas. Due to these different frequency ranges, it is possible to provide natural decoupling of the DAB antenna from the AM-FM antenna. The DAB antenna is preferably designed such that it has a series and parallel resonance within the DAB frequency band, that is to say the second frequency range, while the AM-FM antenna is designed such that it has only a series resonance within the FM frequency band, that is to say the first frequency range. In addition, the FM antenna has a significantly lower efficiency at the base at least in a subregion of the DAB band, as a result of which it is possible to provide natural decoupling from the DAB antenna at least in a subregion of the DAB band. This is required by their design by placing the parallel resonance of this AM-FM antenna close to the beginning of the DAB band. The DAB antenna, on the other hand, has a lower efficiency in the FM band. This is made possible by its size and optional decoupling measures on the common printed circuit board, such as at least one slot, preferably in the first direction between the helical antenna turns of the AM-FM antenna and the DAB antenna.

In addition, the at least one first LTE 5G telephone antenna and the antenna unit can be connected to a common motherboard, or main printed circuit board. This may be oriented substantially parallel to the vehicle roof when the antenna module is arranged on the motor vehicle as intended, for example. The direction details that are also used below, such as the vehicle's longitudinal direction, the vehicle's vertical direction and the vehicle's transverse direction, also refer to the intended installation position of the antenna module in the motor vehicle.

It should also be noted here that the antenna module according to the invention and the embodiments of said antenna module are preferably used on a motor vehicle, but the use of the antenna module should not be limited to the field of motor vehicles. Such an antenna module can be used anywhere and is particularly advantageous where many antenna functions are meant to be provided in the smallest possible installation space.

Furthermore, it is preferred for the respective circuit boards of the antenna unit and the first LTE 5G telephone antenna to be arranged substantially perpendicularly to this main printed circuit board. This allows an optimum radiation characteristic of the respective antennas to be achieved.

As already mentioned above, it is particularly advantageous when the first LTE 5G telephone antenna, or its conductor track structure, is arranged substantially perpendicularly to the path of the helical antenna turns of the DAB antenna and of the AM-FM antenna. Accordingly, a further preferred embodiment of the invention is when the third direction, in which the width of the second circuit board of the first LTE 5G telephone antenna extends, is at an angle with respect to the first and second directions that is between 80 degrees and 100 degrees, and is preferably about 90 degrees. At 90 degrees, the decoupling between the first LTE 5G telephone antenna and the antenna unit is maximized. To allow better illustration, the first direction is intended to be in the vehicle's vertical direction, the second direction in the vehicle's longitudinal direction and the third direction in the vehicle's transverse direction in relation to the intended installation position of the antenna module on the motor vehicle. The first LTE 5G telephone antenna thus extends substantially in the vehicle's vertical direction and in the vehicle's transverse direction, while the helical antenna turns of the DAB antenna and of the AM-FM antenna lie substantially in the horizontal comprising the vehicle's longitudinal direction and are arranged one above the other in the first direction. The gradients of the respective helical antenna turns are preferably kept as slight as possible, since this allows the proportion in the z direction to be limited to a minimum. This maximizes the decoupling from the LTE 5G telephone antenna, allowing an extremely compact arrangement. Preferably, the helical antenna turns have a gradient relative to the horizontal that is less than 5 degrees, preferably less than 3 degrees, for example is 2.2 degrees.

Further special features of the first LTE 5G telephone antenna allow the decoupling from the AM-FM-DAB antenna unit to be improved further. For example, a further very advantageous embodiment of the invention is when the at least one first LTE 5G telephone antenna has a first antenna arm, which is associated with a first frequency range, in particular for frequencies greater than 1 GHZ, and has a second antenna arm, which is associated with a second frequency range, in particular for frequencies less than 1 GHz, wherein the first and the second antenna arm are capacitively coupled to one another and are galvanically isolated from one another. This embodiment can especially prevent excessive coupling to the AM antenna of the antenna unit in a particularly efficient manner. If these two arms were galvanically connected to one another, this would in turn provide a very high coupling capacitance, especially with respect to the AM antenna. This embodiment is based on the idea that the total capacitance can be reduced by connecting two individual capacitances in series, compared with connecting these capacitances in parallel. This can be achieved by the capacitive coupling of the two antenna arms, in particular in contrast to a galvanic connection, which constitutes a high capacitance in the AM range. In addition, an inductive extension can also be provided for the second antenna arm. This can be in the form of a line running in the form of a screw, which is galvanically connected to the second arm. The first arm for the higher frequencies greater than 1 gigahertz can thus capacitively excite the second arm, or the extension, for the lower frequencies less than 1 gigahertz. Therefore there is thus a capacitance between the arm for the higher frequencies and the arm for the lower frequencies. The capacitive coupling surface determines the efficiency and the impedance. This can advantageously be used for decoupling from the AM antenna. Furthermore, it is advantageous when the arm for the lower frequencies, that is to say the second antenna arm, has its own capacitive load on the antenna circuit board, that is to say the second circuit board. This second antenna circuit board may thus have a first side and a second circuit board side that is opposite the first side. For example, the first antenna arm for the higher frequencies may be arranged on the first circuit board side, and the second arm for the low frequencies on the second circuit board side, wherein a roof capacitance for the second arm can also be located on the first circuit board side and can be galvanically connected to the second antenna arm by way of a via through the circuit board. It is thus possible to provide a particularly efficient first LTE 5G telephone antenna having maximum decoupling from the antenna unit.

In addition, the first LTE 5G telephone antenna can have a high-impedance connection to ground for the purpose of antenna detection. This high-impedance connection can be provided by a coil that ensures that radio-frequency signal components are coupled into the LTE 5G telephone antenna and do not drain to ground. This allows a defect or failure of the antenna to be detected, which is important for the e-call function, for example.

In a further very advantageous embodiment of the invention, the antenna module has at least one second LTE 5G telephone antenna, wherein the AM-FM-DAB antenna unit is arranged between the first LTE 5G telephone antenna and the second LTE 5G telephone antenna, in particular wherein the second LTE 5G telephone antenna is arranged on a third circuit board that is oriented perpendicularly to the second circuit board of the first LTE 5G telephone antenna. A further LTE 5G telephone antenna can be used to improve the data transmission rate that can be provided by the antenna module over a mobile radio network. At the same time, such a second LTE 5G telephone antenna can be provided together with the first LTE 5G telephone antenna in an extremely small installation space with maximum decoupling. This can be accomplished firstly by virtue of the two LTE 5G telephone antennas being arranged as far away from one another as possible, for example being the antennas of the antenna module that are furthest away in terms of the second direction, so that the antenna unit and optionally also further antennas are thus arranged between these two first and second LTE 5G telephone antennas, and secondly by virtue of the third circuit board of the second LTE 5G telephone antenna also being oriented perpendicularly to the second circuit board of the first LTE 5G telephone antenna. In addition, the third circuit board is also substantially perpendicular to the aforementioned main printed circuit board and is thus preferably oriented perpendicularly to the vehicle's transverse direction.

The second LTE 5G telephone antenna can also be designed for a frequency range smaller than one gigahertz. In principle, it is also conceivable for the second LTE 5G telephone antenna to be designed in the same way as the first LTE 5G telephone antenna. However, it is also conceivable for said first and second antenna arms of the second LTE 5G telephone antenna not to be capacitively isolated from one another in the present case, for example, since the second LTE 5G telephone antenna may be at a greater distance from the antenna unit than the first LTE 5G telephone antenna.

In addition, it is very advantageous, as provided according to another embodiment of the invention, if the antenna module has a GNSS (Global Navigation Satellite System) antenna. In principle, this can also be arranged anywhere within the antenna module. However, it is particularly advantageous if such a GNSS antenna is arranged between the AM-FM-DAB antenna unit and the second LTE 5G telephone antenna. A GNSS antenna can also be part of the antenna module regardless of the presence of the second LTE 5G telephone antenna, however. If the second LTE 5G telephone antenna is present in the antenna module, however, as described above, it is advantageous if the GNSS antenna is located between this second LTE 5G telephone antenna and the antenna unit. This allows the distance between the two LTE 5G telephone antennas to be maximized. This GNSS antenna receives its signals from satellites and is therefore designed to radiate signals in the first direction, or is optimized for this direction of radiation.

It is also particularly advantageous if the GNSS antenna is in the form of a patch antenna. This allows the GNSS antenna to be integrated into the antenna module in a particularly compact way. At the same time, it is thus possible to provide a direction of radiation in the first direction. In addition, a patch antenna is extremely efficient.

Alternatively, however, the GNSS antenna can also be in the form of a curved dipole antenna with capacitive excitation on a circuit board perpendicular to the second 5G LTE GSM antenna, i.e. the second LTE 5G telephone antenna, and parallel to the first 5G LTE GSM antenna, i.e. the first LTE 5G telephone antenna. This is based on the following insight: When the GNSS antenna is in the form of a patch antenna, in particular directly beside the antenna unit with the very large first roof capacitance, it has been found that the first roof capacitance has a very strongly shielding effect on the patch antenna, which is very shallow in terms of the first direction. This shielding effect can be significantly reduced if the GNSS antenna is instead in the form of a curved dipole antenna on a circuit board perpendicular to the second 5G LTE GSM antenna and parallel to the first 5G LTE GSM antenna with capacitive excitation. The GNSS antenna is essentially in the form of a downwardly open parabola, the downward direction being understood here to mean in the opposite direction to the first direction. This allows intensified radiation to be achieved in the first direction. In addition, the GNSS antenna in such a form extends much higher in the first direction, allowing the shielding effect described for the first roof capacitance to be reduced. In contrast to the aforementioned patch antenna, however, a curved dipole antenna such as this does not radiate circularly polarized signals, but rather only linearly polarized signals. This is entirely adequate for the desired signal strength, however, although a loss of 3 dB compared with the optimal circular polarization is lamentable.

However, there may also be other antennas arranged on the first side of the main printed circuit board, which have not yet been described. For example, it is advantageous if at least one V-to-X antenna is arranged on the first side of the main printed circuit board. A V-to-X antenna, alternatively called a Car-to-X antenna, is used in this case for communication between the vehicle and another vehicle or any other device capable of communication, for example according to the WLANp standard. Due to their typical bandwidth, there is no significant risk of coupling to the other antennas. It is particularly efficient when such a V-to-X antenna is arranged on the same second circuit board as the first LTE 5G telephone antenna and/or the same third circuit board as the second LTE 5G telephone antenna, for example. For example, there may also be provision for two such V-to-X antennas, one on the second circuit board and one on the third circuit board. The front V-to-X antenna, which e.g. is closer to the front of the vehicle, can also be arranged beside the second LTE 5G telephone antenna laterally in terms of the second direction instead of on the third circuit board. The V-to-X antennas emit and receive in a frequency range of about 5 gigahertz and can therefore be very small.

It is also advantageous if two further LTE 5G telephone antennas are arranged on the first side of the main printed circuit board. These can be arranged in an area between the antenna unit and the second LTE 5G telephone antenna relative to the second direction, and, for example, can be arranged beside the GNSS antenna, in particular beside it on both sides, in the third direction. These third and fourth LTE 5G telephone antennas are preferably designed only for higher frequencies greater than 1 gigahertz, which means that they can be arranged much closer to one another and on the first or second LTE 5G telephone antenna. If there is an e-call, this can generally be output using any LTE 5G telephone antenna. The e-call antenna, which is additionally arranged on the inside and thus on the second side of the main printed circuit board, is thus used only as a well-protected backup antenna, which can be used for the e-call in the event of an accident and in the event of a defect in the other LTE 5G telephone antennas, for example. Even the other antennas mentioned, which are arranged in the interior, such as the WLAN (Wireless Local Area Network) antenna and/or UWB (Ultra-Wide Band) antennas, do not have to provide a particularly large range, which means that, here too, particularly simple integration on the other side of the main printed circuit board and thus facing the vehicle interior is possible, without unduly affecting the signal quality.

In a further very advantageous embodiment of the invention, the antenna module has a main printed circuit board, wherein the first LTE 5G telephone antenna and the antenna unit are arranged on a first side of the main printed circuit board, wherein the antenna module has at least one antenna, which is arranged on a second side of the main printed circuit board, which is opposite the first side, in particular wherein the at least one antenna is an e-call antenna and/or a UWB antenna and/or a WLAN antenna and/or a further LTE 5G telephone antenna. Thus, numerous further antennas can advantageously be arranged beneath the main printed circuit board, as it were, and thus in an interior of the motor vehicle, or facing the interior of the motor vehicle. The internal antennas and components, such as said backup antenna for the e-call or the WLAN antennas and also further antennas for other services such as 5G, can be arranged under the vehicle roof inside a box.

Overall, this allows many different antennas to be provided for many different functions in a compact antenna module in the most constricted installation space. Optionally, for example further electrical and/or electronic components, such as tuners, transceivers, receivers, control units or the like, may also be provided and integrated in such an antenna module, in particular on the second side of the main printed circuit board. In other words, the antenna module may comprise an integrated tuner and/or transceiver and/or receiver and/or a bus system. However, this does not necessarily have to be the case. In a further embodiment of the invention, the antenna module does not have an integrated tuner or transceiver or receiver or a bus system. In this case, however, it is preferred for the antenna module to have a matching network and/or an amplifier for at least one antenna that the antenna module comprises, wherein a coaxial cable is connected to the matching network and/or an amplifier for coupling to a module-external tuner or transceiver or receiver.

The antenna module can also be coupled to a vehicle roof in a wide variety of ways. It is preferred for the antenna module to have a good galvanic connection to the roof, which can be achieved without screws or by means of one or more screws. This galvanic connection allows a ground connection to be made to the roof. The roof antenna module can also be of one-part design, or of two-part design, as will be explained in more detail later with reference to the figures. In all cases, however, the antennas have at least one electrical contact with the main printed circuit board to allow a connection to the receivers and transceivers. These may likewise be integrated in the antenna module or else also arranged remotely.

Furthermore, a motor vehicle having an antenna module according to the invention or one of the embodiments of said antenna module is also intended to be regarded as belonging to the invention. The antenna module is then preferably arranged on a roof of the vehicle, in particular beneath a cover or shark fin, as already described.

The invention also covers the combinations of the features of the embodiments described.

An exemplary embodiment of the invention is described below, in which regard:

Figure 8:
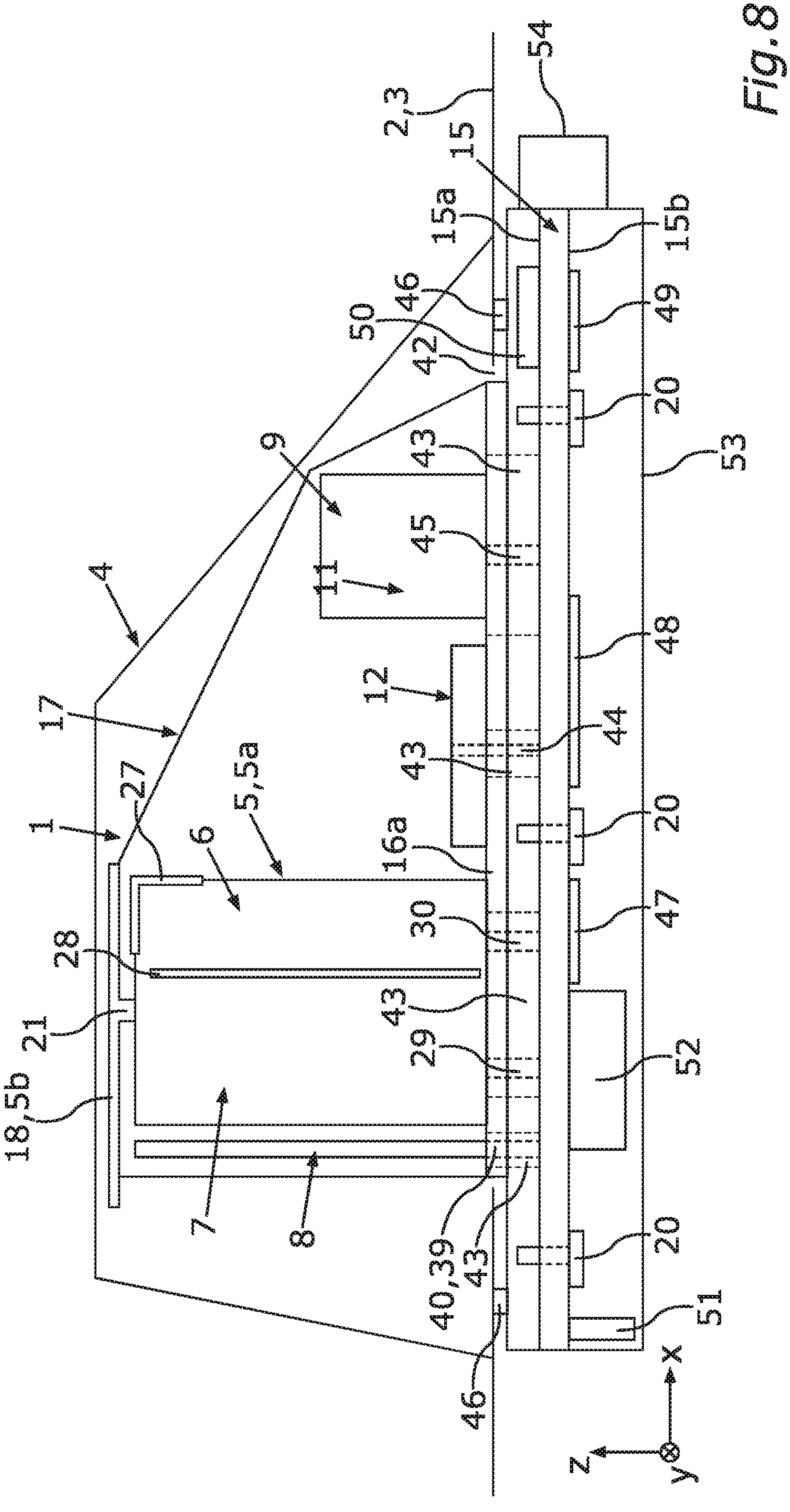
Figure 9:
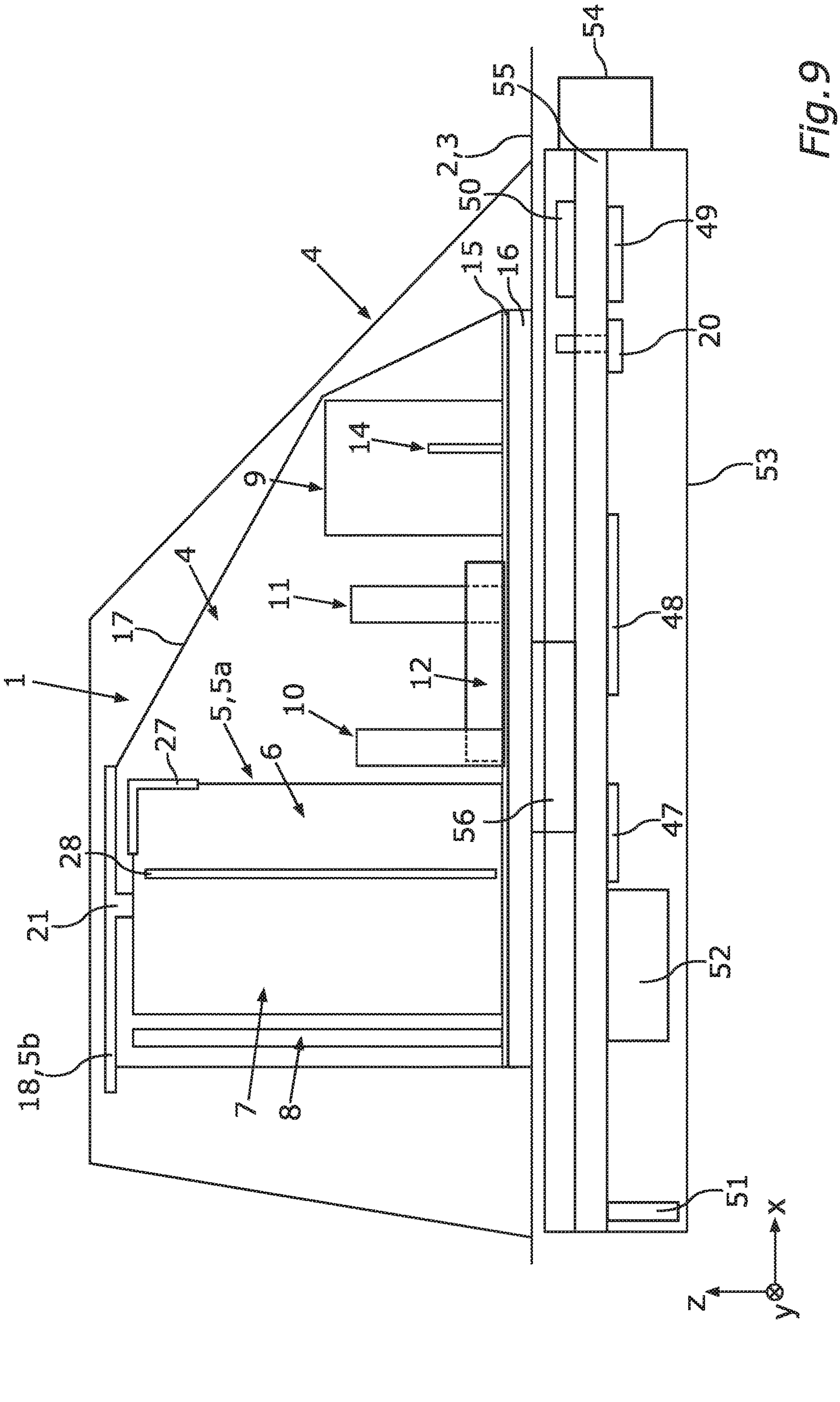

FIG. 8 shows a schematic representation of an antenna module for a motor vehicle for installation on a vehicle roof according to a one-part installation concept with integrated transceivers and tuners, according to an exemplary embodiment of the invention; and FIG. 9 shows a schematic representation of an antenna module according to a two-part installation concept according to a further exemplary embodiment of the invention.

The exemplary embodiment explained below is a preferred embodiment of the invention. In the exemplary embodiment, the described components of the embodiment each represent individual features of the invention that should be considered independently of one another and that each also develop the invention independently of one another and can therefore also be considered to be part of the invention individually or in a combination other than that shown. Furthermore, the embodiment described can also be supplemented by further features of the invention that have already been described.

In the figures, elements with the same function are each provided with the same reference signs.

Figure 1:
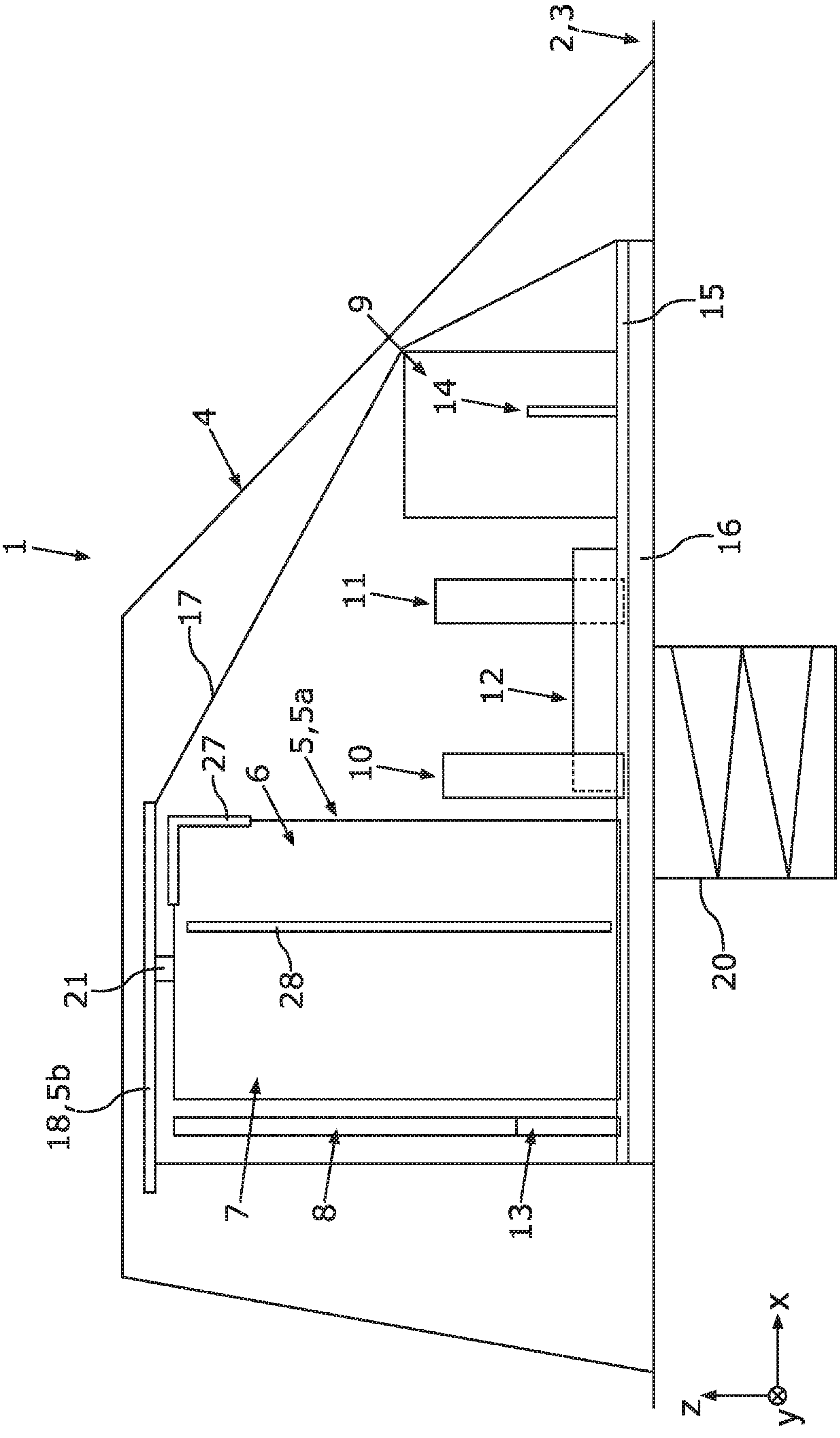
FIG. 1 shows a schematic representation of an antenna module for a motor vehicle for arrangement on a vehicle roof without receiver and tuner integration according to an exemplary embodiment of the invention.

FIG. 1 shows a schematic representation of an antenna module 1 for a motor vehicle 2, of which the vehicle roof 3 and the outer cover 4, installed on the vehicle roof 3, which is also referred to as a shark fin, are shown merely as an example. The antenna module 1 in this instance is embodied as a multifunctional and multiband antenna module 1 in a very small installation space. The antenna module 1 comprises an antenna unit 5, which can also be referred to as an AM-FM-DAB antenna 5, since it comprises both a DAB antenna 6 and a combined AM-FM antenna 7. Furthermore, the antenna module 1 has at least one first LTE 5G telephone antenna 8, which is arranged very close to the antenna unit 5. In addition, in this example, the antenna module 1 also comprises a second LTE 5G telephone antenna 9, a third and a fourth LTE 5G telephone antenna 10, 11, a GNSS antenna 12 and two V-to-X antennas 13, 14. These antenna module components are furthermore arranged on a main printed circuit board 15, which in turn is arranged on a support 16, which can also be referred to as a chassis. Furthermore, a protective cover 17 is arranged at least over most of these antenna module components. Apart from a roof capacitance 18 associated with the antenna unit 5, all other antennas are arranged under this protective cover 17. Furthermore, this antenna module 1 can be installed on the roof 3 of the motor vehicle 2 using a screw connection 20. In this example, the antenna module 1 does not integrate a tuner or transceiver, but requisite amplifiers and matching networks with connected coaxial cables are integrated. Further examples with integrated receivers and tuners will be explained in more detail later.

The invention and its embodiments advantageously make it possible to provide an extremely compact antenna module 1, in which for example the highest antenna, provided by the antenna unit 5 in the present case, is smaller than 10 centimeters in the first direction, corresponding to the z direction shown here, in particular measures only around 7 centimeters in the first direction. With reference to the intended installation position of this antenna module 1 in terms of the motor vehicle 2, the z direction in this case moreover corresponds to the vehicle's vertical direction, the x direction shown here corresponds to the vehicle's longitudinal direction, wherein the x direction in particular pointing toward the front of the vehicle, and the y direction corresponds to the vehicle's transverse direction. The z direction is also referred to as the first direction, the y direction as the third direction and the x direction as the second direction, inter alia. The difficulty in providing such a compact antenna module 1 lies especially not only in being able to produce the individual antennas themselves in as small and compact a form as possible, but especially also in decoupling them from one another sufficiently to avoid mutual interference or influence. This particularly concerns the arrangement of the antenna unit 5 in terms of the first LTE 5G telephone antenna 8. In order to provide, in particular via the mobile radio network, as high a data rate as possible, for example according to the 4G standard or also 5G standard, it is advantageous if the antenna module has four or as many LTE 5G telephone antennas 8, 9, 10, 11 as possible. Two such antennas 8, 9, 10, 11 can be used to provide communication according to the 4G standard if four such antennas 8, 9, 10, 11 are provided for communication according to the 5G standard. The term LTE 5G telephone antenna 8, 9, 10, 11 is thus intended to be understood in the present case to mean that these LTE 5G telephone antennas 8, 9, 10, 11 can be used for communication according to the 5G standard, but not that a single such antenna 8, 9, 10, 11 would already be adequate for this purpose. However, mobile radio communication at lower data transmission rates than according to the 5G standard can already be provided using a single such LTE 5G telephone antenna 8, 9, 10, 11. Both the first and the second LTE 5G telephone antenna 8, 9 can transmit and receive data in a frequency range smaller than 1 gigahertz and larger than 1 gigahertz. In order to provide the best possible decoupling of these two LTE 5G telephone antennas 8, 9, it is advantageous to arrange them as far away from one another as possible, as is also shown in FIG. 1, for example. This was accomplished by virtue of these two antennas 8, 9 being the antennas of the antenna module 1 that are furthest apart from each other in the x direction. However, due to the size of the antenna unit 5, it is necessary to arrange it very close to the first LTE 5G telephone antenna 8. The challenge here is again to ensure adequate decoupling between this first LTE 5G telephone antenna 8 and the antenna unit 5, and secondly also to ensure adequate decoupling of the antennas integrated in the antenna unit 5, namely the DAB antenna 6 and the AM-FM antenna 7. How this can be accomplished will now be explained in more detail below.

In addition, this AM-FM-DAB antenna 5 is placed in the highest area of the roof module 1 and the AM-FM-DAB antenna is moreover implemented in two parts. A first part 5*a* is located beneath the protective cap 17 and the second part 5*b* is the roof capacitance 18 already mentioned. The roof capacitance 18 of the AM-FM-DAB antenna 5 can be arranged on the protective cap 17, as shown, or also integrated in the outer cover 4, that is to say the shark fin. The roof capacitance makes contact with the first part 5*a* of the AM-FM-DAB antenna 5 by means of a contact element 21, which is preferably a spring or an electrically conductive foam material. The contact, that is to say the contact element 21, with the first part 5*a* of the AM-FM-DAB antenna 5 can also be made differently, for example by clamping. Furthermore, this roof capacitance 18 can be implemented as an assembled, for example punched or deep-drawn, metal sheet or glued film. It can also be printed on the protective cap 14. If the roof capacitance 18 is a film, it can have a conductor track structure or be designed as a resonant conductor track structure.

The first part 5*a* is implemented as a vertical PCB (Printed Circuit Board) antenna. The first part 5*a* of this AM-FM-DAB antenna 5 is shown in detail again in FIG. 2 and FIG. 3. Various other variants of this arrangement, i.e. of the antenna module 1 shown, can exist, e.g. because the V-to-X antennas are not present. A major advantage of the invention, however, is the provision and presence of the AM-FM-DAB antenna unit, in particular in its described mode of implementation.

Figure 3:
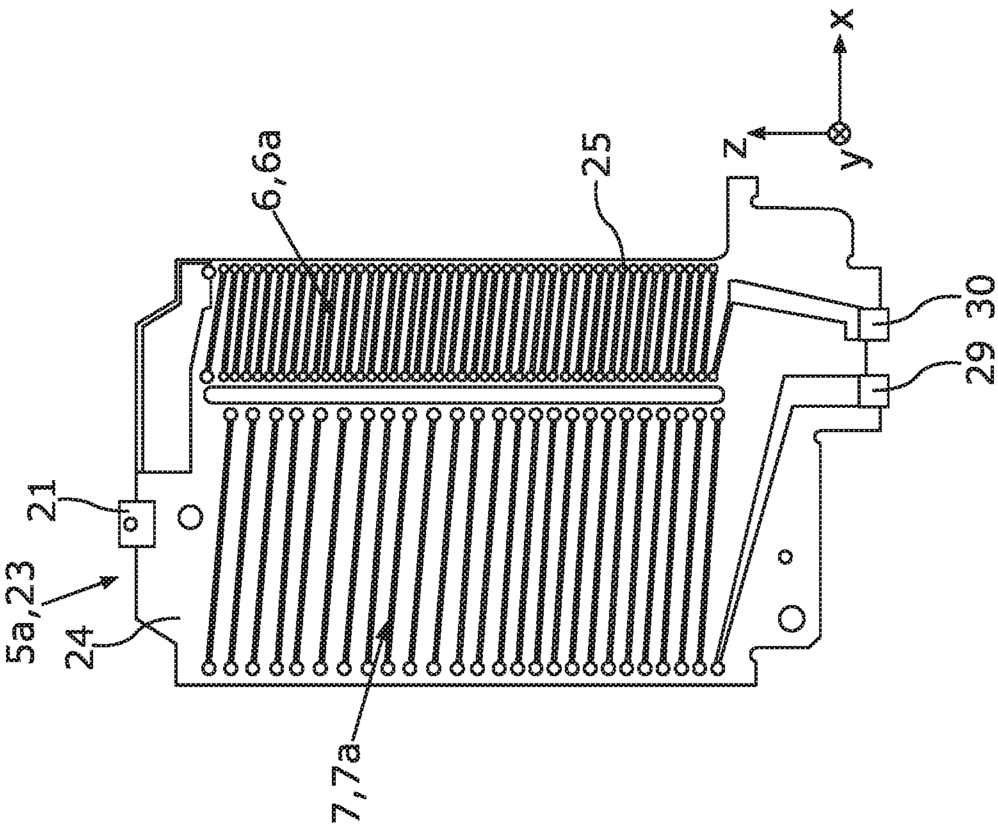
FIG. 3 shows a schematic representation of a plan view of a second side of the first circuit board of the antenna unit with the AM-FM antenna and the DAB antenna, according to an exemplary embodiment of the invention.
Figure 2:
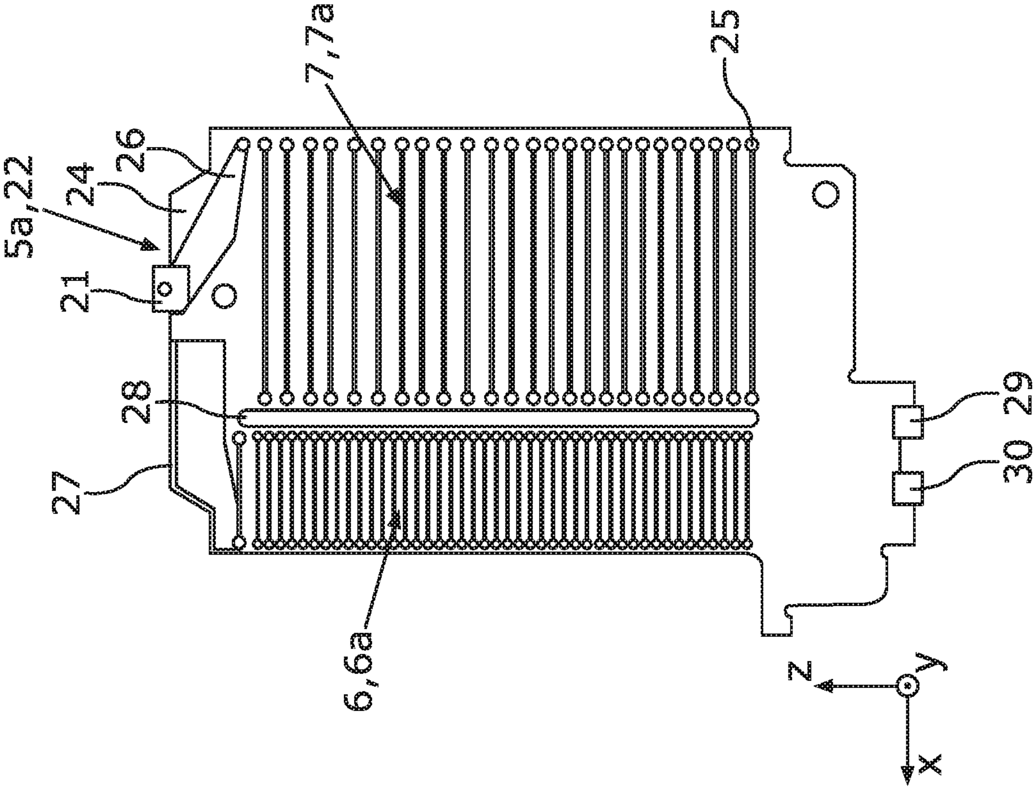
FIG. 2 shows a schematic representation of a plan view of a first side of the first circuit board of the antenna unit, to which the helical antenna turns of the AM-FM antenna and the DAB antenna are fitted, according to an exemplary embodiment of the invention.

FIG. 2 shows a schematic representation of a plan view of a first side 22 of the first part 5*a* and FIG. 3 shows a schematic plan view of the second side 23, which is opposite the first side 22. Both the DAB antenna 6 and the AM-FM antenna 7 comprise a part 6*a*, 7*a* that is designed as a planar helical antenna. These parts 6*a*, 7*a* are thus designed in the form of planar helical turns 6*a*, 7*a* that are arranged on a circuit board, in the present example a common first circuit board 24. The thickness of this circuit board in the y direction can be between 0.5 millimeter and 2 millimeters and is 1 millimeter in the present example. The individual helical antenna turns 6*a*, 7*a* can be fitted to this circuit board 24 as conductor tracks, the individual front and rear conductor track sections being connected to one another by corresponding vias 25, only one of which is provided with a reference sign in FIG. 2 and FIG. 3 for reasons of clarity. These planar helical antennas 6*a*, 7*a* are thus provided to a certain extent in the form of a flattened coil having multiple turns arranged one above the other in the z direction. Furthermore, the helical antenna turns 7*a* of the AM-FM antenna 7 are galvanically connected to the first roof capacitance 18 by way of the coupling element 21, this galvanic connection being denoted by 26 in the present case. The DAB antenna 6 has its own roof capacitance 27, which is also arranged on the circuit board 24, in particular on an edge of the circuit board, preferably an upper edge of the circuit board 24. The DAB antenna 6 thus preferably has no galvanic contact with the first roof capacitance 18, but can be capacitively coupled by way of its own capacitive load, which is designed as a second roof capacitance 27 on the circuit board edge, to the first roof capacitance 18. This facilitates better decoupling between the DAB antenna 6 and the AM-FM antenna 7. In order to additionally strengthen this decoupling, a slot 28 is also provided parallel to the z direction between the DAB antenna 6 and the AM-FM antenna 7, or the relevant helical antenna turns 6*a*, 7*a* thereof, in the present case.

The AM antenna and the FM antenna, which are provided as a combined AM-FM antenna 7 in the present case, accordingly have a common antenna base 29. The DAB antenna 6 has its own base 30. These bases 29, 30 are electrically connected to the main printed circuit board 15.

In principle, it is also conceivable for the DAB antenna 6 and the AM-FM antenna 7 to be provided on separate circuit boards, but the arrangement on a common circuit board 24 has enormous advantages for components. Furthermore, it would also be conceivable to provide the DAB antenna 6 and the AM-FM antenna 7 as a combined antenna, still having two bases 29, 30, but shared turns 6*a*, 7*a*, by virtue of these respective antenna parts 6*a*, 7*a* being arranged not beside one another in the x direction, as shown here, but rather one above the other in the z direction, for example. For example, the antenna turns 6*a* of the DAB antenna 6 can also be arranged above the antenna turns 7*a* of the AM-FM antenna 7 in the z direction and can also be galvanically connected to said turns. The individual turns 6*a*, 7*a* can then extend over almost the entire width in the x direction of the circuit board 24, increasing the efficiency thereof. The base 30 associated with the DAB antenna 6 can be implemented by way of a tap. Such a tap can be implemented by a conductor track running in the z direction. In order to reduce coupling to the first LTE 5G telephone antenna 8, which is arranged extremely adjacently, as much as possible, however, it is preferred for the first part 5*a* of the antenna unit 5 to be designed as shown in FIG. 2 and FIG. 3, namely by providing the DAB antenna 6 and the AM-FM antenna 7, each having separate antenna turns 6*a*, 7*a*, beside one another in the x direction. The background to this is that the electrically conductive components of the antenna unit 5 that run in the z direction can thus be reduced to a minimum. This advantageously allows maximum decoupling from the adjacently arranged LTE 5G telephone antenna 8 to be provided, which antenna, as will be explained in more detail later, is arranged on a circuit board whose height extends in the z direction and whose width extends in the y direction and that is thus oriented perpendicularly to the first circuit board 24 of the first part 5*a* of the antenna unit 5. As a result of the antenna parts 6*a*, 7*a* being in the form of planar helical turns 6*a*, 7*a*, these turns 6*a*, 7*a* also have barely any extent in the y direction. Accordingly, maximum decoupling from the LTE 5G telephone antenna 8 can also be provided in this direction. The individual turns 6*a*, 7*a* are preferably oriented as horizontally as possible, that is to say parallel to the x-y plane. This is implemented in the present example by virtue of the turns 6*a*, 7*a* being designed to run horizontally on the first side 22 of the circuit board 24 and to have the slightest possible gradient relative to the horizontal, which is preferably no greater than 5 degrees, particularly preferably less than 3 degrees, for example 2.2 degrees, on the second side 23.

Figure 4:
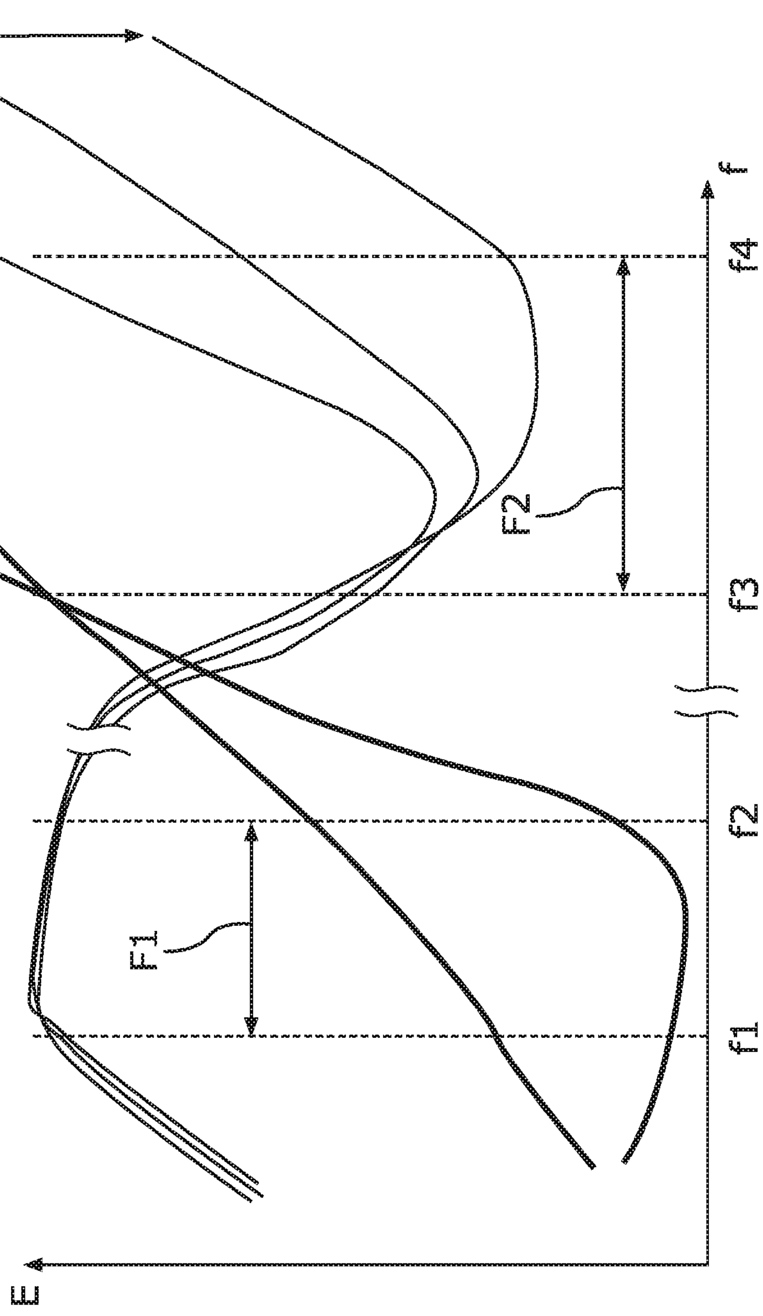
FIG. 4 shows a schematic representation of the efficiency of the AM-FM antenna and the DAB antenna according to an exemplary embodiment of the invention.

In order to also ensure the best possible decoupling between the DAB antenna 6 and the AM-FM antenna 7, these have different efficiencies in different frequency ranges, which can also be referred to as antenna gain, as illustrated in FIG. 4. In this instance, FIG. 4 shows three curves 7*b* for efficiency E for the AM-FM antenna 7 by way of example, and two possible curves 6*b* for efficiency E for the DAB antenna 6 by way of example, each as a function of frequency f. As can be seen, the FM antenna 7 preferably has a significantly higher efficiency E in a first frequency range F1 than, on the one hand, the DAB antenna 6 and, on the other hand, the FM antenna 7 in a second frequency range F2, in which its efficiency E is preferably significantly lower than that of the DAB antenna 6. The first frequency range F1 corresponds to the FM frequency range and is limited, for example, by the lower cutoff frequency f1 and the upper cutoff frequency f2. For example, f1 can be 87.5 megahertz and f2 can be 108 megahertz. The second frequency range F2 is the DAB frequency range and extends from a third frequency f3 to a fourth frequency f4. For example, the third frequency f3 can be 174 megahertz and the fourth frequency f4 can be 240 megahertz. In order to accomplish this, the applicable antennas 6, 7 can be of suitable design with regard to their geometry. Due to the geometric properties of an antenna, it is possible to influence in particular series and parallel resonance of the applicable antennas. The DAB antenna 6 is preferably designed in such a way that it has a series and parallel resonance within the DAB frequency band F2. The parallel resonance of the AM-FM antenna 7 is preferably placed close to the beginning of the DAB band F2. This allows natural decoupling to be provided. The circumstance of the DAB antenna 6 having a lower efficiency in the FM band F1 is provided, on the one hand, by geometric properties such as its length and, on the other hand, additionally by the provision of slots, such as the slot 28 already described with reference to FIG. 2 and FIG. 3.

In order to provide good decoupling from the first LTE 5G telephone antenna 8, further decoupling measures can also be implemented by this first LTE 5G telephone antenna 8 itself, as will now be described in more detail below with reference to FIG. 5 and FIG. 6.

Figure 7:
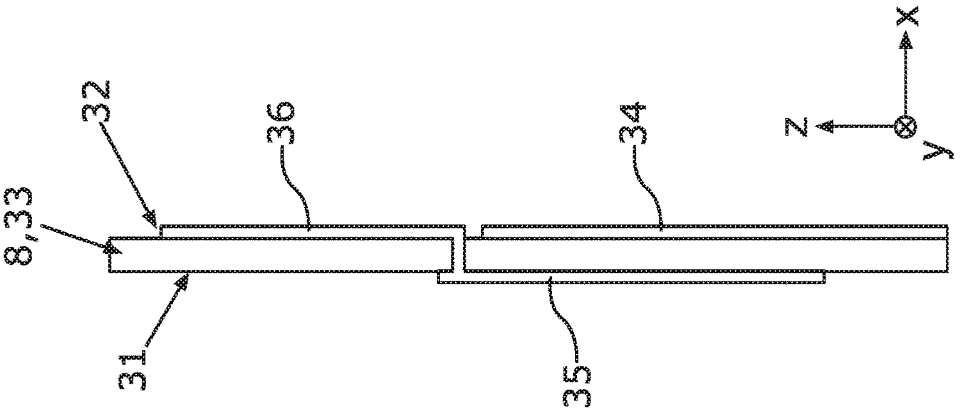
FIG. 7 shows a schematic representation of the first LTE 5G telephone antenna in a sectional view according to an exemplary embodiment of the invention.
Figure 6:
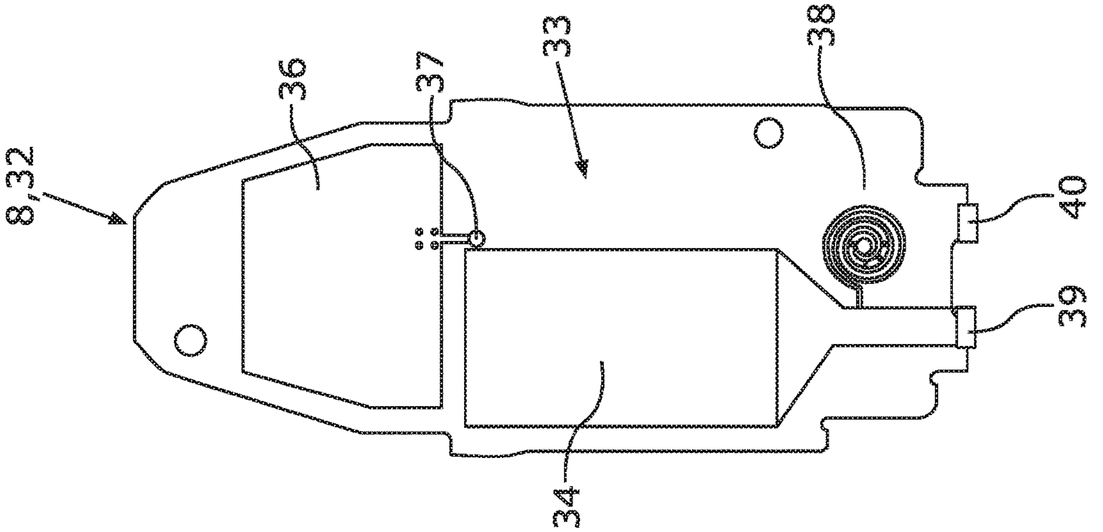
FIG. 6 shows a schematic representation of the first LTE 5G telephone antenna in a plan view of a second side that is opposite the first side, according to an exemplary embodiment of the invention.
Figure 5:
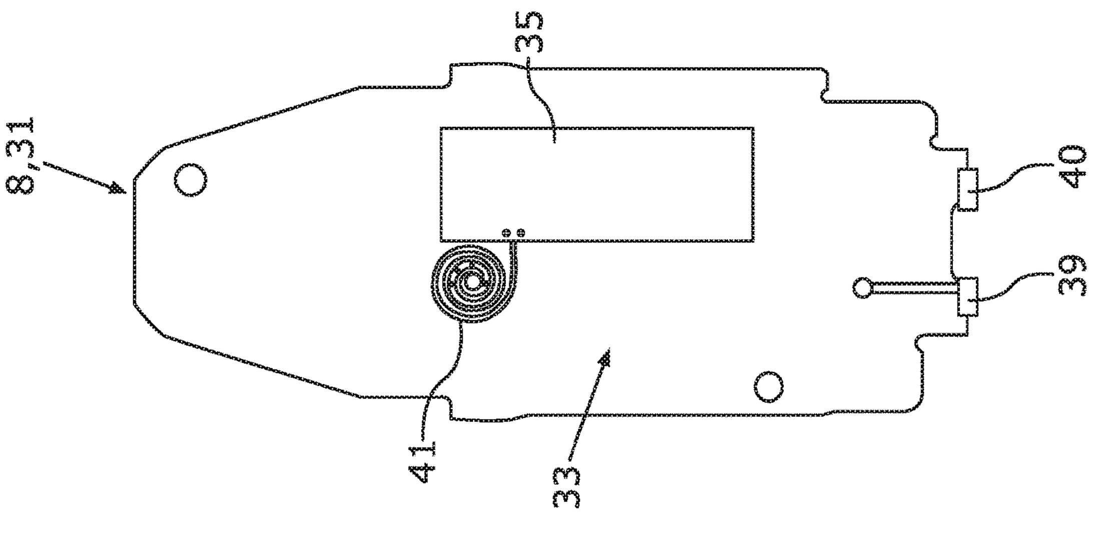
FIG. 5 shows a schematic representation of the first LTE 5G telephone antenna in a plan view of a first side according to an exemplary embodiment of the invention.

FIG. 5 shows a schematic representation of the first LTE 5G telephone antenna 8 in a plan view of a first side 31 and FIG. 6 shows a schematic representation of this antenna 8 in a plan view of a second side 32 that is opposite the first side 31. This antenna 8 is also implemented as a PCB antenna 8. Accordingly, the antenna parts are arranged on a corresponding second circuit board 33. FIG. 7 also shows a schematic illustration of this first LTE 5G telephone antenna 8 in a side view or sectional view in a section perpendicular to the y axis. This LTE 5G telephone antenna 8 has two antenna arms 34, 35, which are arranged on different circuit board sides 31, 32 of the circuit board 33. The first antenna arm 34 is for high frequencies, in particular greater than 1 gigahertz, and the second arm 35 is for low frequencies, in particular less than one gigahertz. These two antenna arms 34, 35 are now advantageously not galvanically connected to one another, but only capacitively coupled to one another. As a result, capacitive excitation is provided for the first LTE 5G telephone antenna 8 by virtue of the first arm 34 for the higher frequencies capacitively exciting the second arm 35, or the extension 36 thereof, for the lower frequencies. This extension 36 may in turn be arranged on the second side 32 of the circuit board 33, on which the first arm 34 is also located, this extension 36 being galvanically connected to the second arm 35 by way of a via 37 through the circuit board 33. There is therefore a capacitance between the arm 34 for the higher frequencies and the arm 35 for the lower frequencies. The capacitive coupling surface determines the efficiency and the impedance of the antenna 8. Furthermore, the arm 35 for the lower frequencies has its own capacitive load 36, said extension 36, on the antenna circuit board 33. This design can advantageously provide particularly good decoupling from the AM antenna 7. Furthermore, the first LTE 5G telephone antenna 8 has a high-impedance connection in the form of a coil 38 to ground 39, or to the ground contact terminal 39 provided on the circuit board 33, for the purpose of detection. The base of the antenna 8 is denoted by 40. This high-impedance coil 39 advantageously routes high frequencies into the antenna 8. A voltage tap on this coil 38 can be used to detect if the antenna 8 fails, for example due to a defect or an accident involving the vehicle 2. The backup antenna, which will be explained in more detail later, can then be used to transmit an e-call, for example. Furthermore, the arm 35 for the low frequencies also has an inductive extension 41.

This design of the first LTE 5G telephone antenna 8 also advantageously allows said antenna to be arranged extremely close to the antenna unit 5, as is also illustrated in FIG. 1 or also in FIG. 8 and FIG. 9, for example.

FIG. 8 shows an antenna module 1 according to a further exemplary embodiment of the invention. Otherwise, this antenna module 1 may be designed as described previously, apart from the differences explained below. In particular, this antenna module 1 may also have the antennas explained with reference to FIG. 1 if the third and fourth LTE 5G telephone antennas 10, 11 are not shown as an example right here. The two V-to-X antennas 13, 14 are not shown here either, but may nevertheless be part of this antenna module 1. The antennas already mentioned with reference to FIG. 1 are arranged on a first side 15*a* of the main printed circuit board 15 in this instance, components that will be explained in even more detail later also being able to be arranged on the opposite side 15*b* of this main printed circuit board 15. In this example, the antenna module 1 is designed according to a one-part installation concept, according to which this assembled antenna module 1 as a whole can be inserted through a hole or a passage opening 42 in the vehicle roof 3 from below and installed. In other words, the roof antenna module 1 is implemented so as to be able to be installed only from the inside of the vehicle in this example. Only the external part of the module 1, that is to say those components that are located on the first side 15*a* of the main printed circuit board 15 and are above the chassis, is inserted through the cutout 42 in this case. The individual antennas and components of the antenna module 1 on the first side 15*a* of the main printed circuit board 15 can be installed again using a separate support element 16*a*, a chassis that is firmly connected to the inner part of the antenna module 1. This support element 16*a* has a corresponding opening 43 for each antenna, through which the base(s) 29, 30, 39, 40 and those of the other antennas go in order to ensure the electrical contact between each antenna and the main printed circuit board 15. In this case, 44 denotes the base of the GNSS antenna 12 and 45 denotes the base of the second LTE 5G telephone antenna 9. This antenna module 1 can be connected to the roof 3 of the vehicle 2 using a metallized foam 46. Said foam can in turn provide compensation for tolerances in the z direction at the same time. At least the antennas located on the first side 15*a* of the main printed circuit board 15 are, in particular like the GNSS antennas 12 in this example, all oriented perpendicularly to the main printed circuit board 15 and in the form of respective PCB antennas. It is also particularly advantageous for the first circuit board 24 of the antenna unit 5 to be perpendicular to the second circuit board 33 of the first LTE 5G telephone antenna.

The main printed circuit board 15 can again be secured to the support element 16*a* using appropriate screw connections 20.

The second LTE 5G telephone antenna 9 is furthermore preferably again oriented perpendicularly to the first LTE 5G telephone antenna 8 in order to provide maximum decoupling therefor. If there is provision for further LTE 5G telephone antennas 10, 11, as shown in FIG. 1, for example, these are preferably again oriented parallel to the first LTE 5G telephone antenna 8.

In this example, the GNSS antenna 12 is in the form of a patch antenna. It is therefore very shallow in terms of the z direction and has a circular radiation characteristic that, for the most part, is directed vertically upward, that is to say in the z direction. In order to reduce possible shielding by the roof capacitance 18, there may, however, also be provision for this GNSS antenna 12 to also be in the form of a PCB antenna instead, that is to say with a circuit board that is in turn preferably oriented perpendicularly to the main printed circuit board 15. On such a circuit board, the GNSS antenna 12 may be in the form of a dipole-like antenna on a circuit board perpendicular to the second 5G LTE GSM antenna and parallel to the first 5G LTE GSM antenna, for example in the form of a downwardly open arc or a downwardly open parabola, with capacitive infeed. The maximum height available in the z direction beneath the protective cap 17 can be used to implement this GNSS antenna 12 in this case. A dipole-like antenna solution such as this advantageously also makes it possible to provide a main radiation direction in the z direction, or a corresponding reception characteristic. In contrast to the patch antenna 12 shown here, a dipole-like antenna solution such as this is designed only for the transmission of linearly polarized signals. A dipole-like antenna solution such as this with capacitive infeed on a circuit board perpendicular to the second 5G LTE GSM antenna and parallel to the first 5G LTE GSM antenna allows decoupling of this antenna in the GNSS band and a function of AM to be achieved.

In this example, the antenna module 1 additionally also has receivers or transceivers 47 and a tuner 48. Furthermore, the antenna module may also comprise a control unit 49 and a power supply 50. These components may be arranged directly on the main printed circuit board 15, in particular on the second side 15*b* thereof, but in some cases also on the first side 15*a*. Furthermore, there is also provision for further antennas on the second side 15*b* of the main printed circuit board 15, such as a WLAN antenna 51 and a backup e-call antenna 52. Although only one receiver 47 is shown as an example here, several of these can be arranged on the main printed circuit board 15. The following components are especially advantageous: An LTE 5G telephone transceiver, a radio tuner, a GNSS receiver, a WLAN transceiver and a V-to-X receiver, in particular for each V-to-X antenna 13, 14, if present. All of these receivers and transceivers are preferably integrated in the lower box 53 on the main printed circuit board 15. All the antennas also have at least one electrical contact with the main printed circuit board 15 to ensure a connection to the receivers and transceivers. The antenna module may also have at least one or more digital interfaces or at least one connector 54, via which the antenna module 1 is able to be coupled to a vehicle bus, for example a CAN bus, Ethernet, a FlexBus and so on.

Furthermore, the antenna module 1 may also be designed according to a two-part concept, as illustrated by way of example in FIG. 9.

FIG. 9 shows a schematic representation of the antenna module 1 according to a further exemplary embodiment of the invention. Here too, the antenna module 1 can again be designed as described previously and can also have the corresponding components and antennas as described or shown with reference to FIG. 1 and/or FIG. 8. In the present case, the difference in FIG. 9 is merely in the manner in which the antenna module 1 is installed on the roof 3 of the motor vehicle 2. The antenna module 1 is designed according to a two-part concept and, in this example, accordingly has two main printed circuit boards 15, 55. A first main printed circuit board 15 is associated with the antennas arranged above the roof 3 and a second printed circuit board 55 is associated with the antenna components arranged beneath the roof 3. The two main printed circuit boards 15, 55 can be electrically conductively connected to one another through the roof 3 of the motor vehicle by way of an appropriate connector 56. A two-part antenna module 1 such as this can be used to install the external part thereof from outside and to install the internal part from inside.

Overall, the example shows how the invention can provide a multifunctional and multiband smart roof antenna module having an integrated electrical, very small AM-FM-DAB antenna, which module allows numerous antennas, in particular a first LTE 5G telephone antenna, an AM, FM, DAB antenna, a GNSS antenna and at least one second LTE 5G antenna, to be integrated into a very small installation space volume outside the vehicle and installed. The number of external antennas can be increased to 12 by integrating two V-to-X antennas, two further LTE 5G telephone antennas and two UWB antennas in the same volume. This volume is the same as that for today's roof antennas with significantly fewer antennas accommodated therein. In addition, at least two antennas, in particular an e-call back-up antenna and a WLAN antenna, can be installed inside the vehicle. The number of internal antennas can be increased to six by adding two UWB antennas, a further WLAN antenna and a further LTE 5G telephone antenna.

LIST OF REFERENCE SIGNS

1 Antenna module
2 Motor vehicle
3 Vehicle roof
4 Outer cover
5 Antenna unit
5*a* First part of the antenna unit
5*b* Second part of the antenna unit
6 DAB antenna
6*a* Helical antenna turns of the DAB antenna
6*b* Efficiency curve of the DAB antenna
7 AM-FM antenna
7*a* Helical antenna turns of the AM-FM antenna
7*b* Efficiency curve of the AM-FM antenna
8 First LTE 5G telephone antenna
9 Second LTE 5G telephone antenna
10 Third LTE 5G telephone antenna
11 Fourth LTE 5G telephone antenna
12 GNSS antenna
13 V2X antenna
14 V2X antenna
15 Main printed circuit board
15*a* First side of the main printed circuit board
15*b* Second side of the main printed circuit board
16 Support
16*a* Support element
17 Protective cover
18 First roof capacitance
20 Screw connection
21 Contact element
22 First circuit board side of the antenna unit
23 Second circuit board side of the antenna unit
24 First circuit board
25 Via
26 Galvanic connection
27 Second roof capacitance
28 Slot
29 Base of the AM-FM antenna
30 Base of the DAB antenna
31 First circuit board side of the first LTE 5G telephone antenna
32 Second circuit board side of the first LTE 5G telephone antenna
33 Second circuit board
34 First antenna arm
35 Second antenna arm
36 Extension
37 Via
38 Coil
39 Ground contact
40 Base of the first LTE 5G telephone antenna
41 Extension
42 Passage opening
43 Opening
44 Base of the GNSS antenna
45 Base of the second LTE 5G telephone antenna
46 Metallized foam
47 Transceiver
48 Tuner
49 Control unit
50 Power supply
51 WLAN antenna
52 E-call backup antenna
53 Box
54 Connector
55 Second main printed circuit board
56 Connector
E Efficiency
F Frequency
F1 First frequency range
F2 Second frequency range
f1 First frequency
f2 Second frequency
f3 Third frequency
f4 Fourth frequency

The invention claimed is:

1. An antenna module for a motor vehicle, the antenna module comprising:
at least one combined AM-FM antenna and a DAB antenna,
wherein the antenna module comprises an antenna unit comprising the at least one combined AM-FM antenna in which an AM antenna and an FM antenna have a common base, and the DAB antenna,
wherein the antenna unit has at least one first circuit board having a first height in a first direction and a first width in a second direction that is perpendicular to the first direction,
wherein helical antenna turns of the AM-FM antenna and DAB antenna, at least part of which is in a form of a planar helical antenna, are arranged on the at least one first circuit board,
wherein the helical antenna turns, at least for the most part, run in the second direction,
wherein the antenna module has at least one first LTE 5G telephone antenna arranged on a second circuit board having a second height in the first direction and a second width in a third direction that is different from the first and second directions, in particular wherein the third direction is at an angle with respect to the first and second directions that is between 80° and 100°,
wherein the at least one first LTE 5G telephone antenna has a first antenna arm, wherein the first antenna arm is associated for frequencies greater than 1 GHz and a second antenna arm which is associated for frequencies less than 1 GHZ, and
wherein the first antenna arm and the second antenna arm are capacitively coupled to one another and are galvanically isolated from one another.

2. The antenna module as claimed in claim 1, wherein the antenna module has at least one second LTE 5G telephone antenna, wherein the antenna unit is arranged between the first LTE 5G telephone antenna and the second LTE 5G telephone antenna.

3. The antenna module as claimed in claim 2, wherein the antenna module has a GNSS antenna that is arranged between the antenna unit and the second LTE 5G telephone antenna.

4. The antenna module as claimed in claim 3, wherein the GNSS antenna is in the form of a patch antenna.

5. The antenna module as claimed in claim 3, wherein the GNSS antenna is in the form of a curved dipole antenna with capacitive excitation on a circuit board perpendicular to the second 5G LTE GSM antenna and parallel to the first 5G LTE GSM antenna.

6. The antenna module as claimed in claim 2, wherein the second LTE 5G telephone antenna is arranged on a third circuit board that is oriented perpendicularly to the second circuit board of the first LTE 5G telephone antenna.

7. The antenna module as claimed in claim 6, wherein the antenna module has a GNSS antenna that is arranged between the antenna unit and the second LTE 5G telephone antenna.

8. The antenna module as claimed in claim 7, wherein the GNSS antenna is in the form of a patch antenna.

9. The antenna module as claimed in claim 7, wherein the GNSS antenna is in the form of a curved dipole antenna with capacitive excitation on a circuit board perpendicular to the second 5G LTE GSM antenna and parallel to the first 5G LTE GSM antenna.

10. The antenna module as claimed in claim 1, wherein the helical antenna turns of the DAB antenna and of the AM-FM antenna are arranged beside one another in the second direction on a common first circuit board, and wherein the AM-FM antenna has a first roof capacitance that is arranged above the first circuit board in the first direction and that is galvanically coupled to the helical antenna turns of the AM-FM antenna.

11. The antenna module as claimed in claim 10, wherein the DAB antenna has a second roof capacitance that is arranged on a circuit board edge of the first circuit board above the helical antenna turns of the DAB antenna in the first direction and is galvanically connected to the helical antenna turns of the DAB antenna.

12. The antenna module as claimed in claim 1, wherein the AM-FM antenna has a higher efficiency in a first specific frequency range than in a specific second frequency range, and wherein the DAB antenna has a lower efficiency than the AM-FM antenna in the first specific frequency range and a lower efficiency than in the second specific frequency range, in which the DAB antenna also has a higher efficiency than the AM-FM antenna.

13. The antenna module as claimed in claim 1, wherein the antenna module has a main printed circuit board, wherein the first LTE 5G telephone antenna and the antenna unit are arranged on a first side of the main printed circuit board, and wherein the antenna module comprises at least one antenna, which is arranged on a second side of the main printed circuit board, which is opposite the first side.

14. The antenna module as claimed in claim 13, wherein the at least one antenna is an e-call antenna and/or a UWB antenna and/or a WLAN antenna and/or a further LTE 5G telephone antenna.

15. The antenna module as claimed in claim 1, wherein the antenna module comprises an integrated tuner and/or transceiver and/or receiver and/or a bus system.

16. The antenna module as claimed in claim 1, wherein the antenna module does not comprise an integrated tuner or transceiver or receiver or a bus system, wherein the antenna module has a matching network and/or an amplifier for at least one antenna that the antenna module comprises, and wherein a coaxial cable is connected to the matching network and/or an amplifier for coupling to a module-external tuner or transceiver or receiver.

* * * * *